(12) United States Patent
Iemura et al.

(10) Patent No.: US 8,087,500 B2
(45) Date of Patent: Jan. 3, 2012

(54) VIBRATIONAL ENERGY ABSORBING APPARATUS

(75) Inventors: Hirokazu Iemura, Kyoto (JP); Ikuo Shimoda, Tokyo (JP); Osamu Kochiyama, Tochigi (JP)

(73) Assignee: Oiles Corporation, Tokyo (JP)

( * ) Notice: Subject to any disclaimer, the term of this patent is extended or adjusted under 35 U.S.C. 154(b) by 0 days.

(21) Appl. No.: 12/518,517

(22) PCT Filed: Dec. 13, 2006

(86) PCT No.: PCT/JP2006/324879
§ 371 (c)(1),
(2), (4) Date: Aug. 31, 2009

(87) PCT Pub. No.: WO2008/072325
PCT Pub. Date: Jun. 19, 2008

(65) Prior Publication Data
US 2010/0019425 A1    Jan. 28, 2010

(30) Foreign Application Priority Data
Sep. 13, 2005    (JP) .................. 2005-266026

(51) Int. Cl.
*F16F 9/48*    (2006.01)
(52) U.S. Cl. ..................... 188/312; 188/266.5
(58) Field of Classification Search ........... 188/266.2, 188/305, 312, 322.2; 701/37
See application file for complete search history.

(56) References Cited

U.S. PATENT DOCUMENTS

| | | | | |
|---|---|---|---|---|
| 4,655,440 A | * | 4/1987 | Eckert | 267/64.11 |
| 4,786,034 A | * | 11/1988 | Heess et al. | 267/64.15 |
| 4,936,423 A | * | 6/1990 | Karnopp | 188/266.5 |
| 5,024,302 A | * | 6/1991 | Karnopp | 188/266.4 |
| 5,368,142 A | * | 11/1994 | Ashiba et al. | 188/282.1 |
| 6,371,262 B1 | * | 4/2002 | Katou et al. | 188/266.5 |
| 2006/0054434 A1 | * | 3/2006 | Fukuda et al. | 188/313 |

(Continued)

FOREIGN PATENT DOCUMENTS

JP    55-024201    2/1980

(Continued)

OTHER PUBLICATIONS

International Search Report for PCT/JP2006/324879 mailed Jan. 16, 2007.

*Primary Examiner* — Christopher Schwartz
(74) *Attorney, Agent, or Firm* — Nixon & Vanderhye P.C.

(57) ABSTRACT

A vibrational energy absorbing apparatus 1 includes: a reciprocating member 2 which is reciprocatable in H directions between positive and negative maximum displacement positions D±max with respect to an origin position O; a damping-force generating means 3 for generating a damping force R with respect to the reciprocating motion of the reciprocating member 2 in the H directions; and a controlling means 4 for controlling the damping-force generating means 3 so as to cause the damping-force generating means 3 to generate a fixed damping force R in the respective movement of the reciprocating member 2 in the H direction from the positive and negative maximum displacement position D±max to the origin position O in the reciprocating motion thereof in the H directions, while causing the damping-force generating means 3 to substantially not generate the damping force R in the respective movement of the reciprocating member 2 in the H direction from the origin position O to the positive and negative maximum displacement position D±max following that movement in the H direction.

18 Claims, 3 Drawing Sheets

U.S. PATENT DOCUMENTS

2006/0224287 A1* 10/2006 Izawa et al. .................. 701/37

FOREIGN PATENT DOCUMENTS

| JP | 63-130943 | 6/1988 |
| JP | 2004-301306 | 10/2004 |
| JP | 2005-207508 | 8/2005 |
| JP | 2005-248520 | 9/2005 |
| JP | 2006-17173 | 1/2006 |
| JP | 2006-22871 | 1/2006 |
| JP | 2006-57279 | 3/2006 |

* cited by examiner

VIBRATIONAL ENERGY ABSORBING APPARATUS

This application is the U.S. national phase of International Application No. PCT/JP2006/324879 filed 13 Dec. 2006, the entire contents of which is hereby incorporated by reference.

TECHNICAL FIELD

The present invention relates to a vibrational energy absorbing apparatus for absorbing vibrational energy so as to dampen as speedily as possible vibrations occurring in a structure or a base-isolated structure including multiple dwelling houses such as condominiums, office buildings, detached houses, bridges, and the like, and to a structure having such an apparatus.

BACKGROUND ART

As vibrational energy absorbing apparatuses (dampers) of this type, viscous dampers, friction dampers, lead dampers, steel bar dampers, and the like are known. Such a vibrational energy absorbing apparatus is applied to a structure together with such as a spring device for returning the structure to an initial position.

Patent Document 1: JP-A-2003-287079

Non-patent Document 1: Nakata, Temura, and Igarashi: "Pseudo-Negative Stiffness Added Type Semi-Active Vibration Control Experiment of Full-Scale Connected Structures," Proceedings of the 56th JSCE Annual Meeting, Japan Society of Civil Engineers, October 2001, pp. 162-163.

Non-patent Document 2: Ienaga, Igarashi, and Suzuki: "Real-time Hybrid Test on Application of MR Dampers to Semi-Active Pseudo-Negative Stiffness Control", Proceedings of the 2003 Annual Meeting of the Japan Association for Earthquake Engineering, pp. 268-269.

DISCLOSURE OF THE INVENTION

Problems that the Invention is to Solve

Incidentally, if a vibrational energy absorbing apparatus such as a viscous damper, a friction damper, or the like together with a spring device is applied to a structure, e.g., a base-isolated structure, the resistance force of the vibrational energy absorbing apparatus in addition to the restoring force of the spring device is added to the structure during a vibration, the structure is subjected to a large force. As a result, the rigidity of the portion which receives the resistance force of the vibrational energy absorbing apparatus and the restoring force of the spring device is inevitably made large.

The present invention has been devised in view of the above-described aspects, and its object is to provide a vibrational energy absorbing apparatus which makes it unnecessary to make especially large the rigidity of that portion of the structure which receives the resistance force and the restoring force of the restoring means, and a structure having the apparatus.

Means for Solving the Problems

A vibrational energy absorbing apparatus in accordance with the invention comprises: a reciprocating member which is reciprocatable between positive and negative maximum displacement positions with respect to an origin position; damping-force generating means for generating a damping force with respect to the reciprocating motion of the reciprocating member; and controlling means for controlling the damping-force generating means so as to cause the damping-force generating means to generate a damping force in the respective movement of the reciprocating member from the positive and negative maximum displacement position to the origin position in the reciprocating motion thereof: while causing the damping-force generating means to substantially not generate the damping force in the respective movement of the reciprocating member from the origin position to the positive and negative maximum displacement position following that movement.

According to the vibrational energy absorbing apparatus in accordance with the invention, the arrangement provided is such that the controlling means causes the damping-force generating means to generate a damping force in the respective movement of the reciprocating member from the positive and negative maximum displacement position to the origin position in the reciprocating motion thereof, while causing the damping-force generating means to substantially not generate the damping force in the respective movement of the reciprocating member from the origin position to the positive and negative maximum displacement position following that movement. Therefore, even if the vibrational energy absorbing apparatus is installed to the structure by connecting the reciprocating member to that structure for the purpose of vibration control of the structure, in the respective movement from the origin position to the positive and negative maximum displacement position in the vibration of the structure due to an earthquake or the like, a force based on the damping force of the vibrational energy absorbing apparatus is not generated at that portion of the structure to which the reciprocating member is connected. As a result, the rigidity of that portion need not be made very large. Moreover, in the respective movement from the positive and negative maximum displacement position to the origin position in the vibration of the structure due to an earthquake or the like, the returning force of a juxtaposed origin returning device and the damping force of the vibrational energy absorbing apparatus are offset by each other, which also makes it unnecessary to make very large the rigidity of that portion of the base-isolated structure to which the reciprocating member is connected.

The positive and negative maximum displacement positions of the reciprocating member in the invention vary according to the magnitude of the vibration of the structure, become large in the case where the vibration of the structure is large, conversely become small in the case where the vibration of the structure is small, and become small in conjunction with the damping of the vibration of the structure.

The controlling means in the invention may be adapted to control the Damping-force generating means so as to cause the damping-force generating means to generate a substantially fixed non-zero damping force in the respective movement of the reciprocating member from the positive and negative maximum displacement position to the origin position in the reciprocating motion thereof. Alternatively, the controlling means may be adapted to control the damping-force generating means so as to cause the damping-force generating means to generate a gradually decreasing damping force in the respective movement of the reciprocating member from the positive and negative maximum displacement position to the origin position in the reciprocating motion thereof.

The damping-force generating means is sufficient if it makes use of viscous resistance, visco-elastic resistance, frictional resistance, or elasto-plastic resistance, or such as a combination thereof.

The controlling means in the invention may be constructed by using an orifice passage, a one-way valve, and a control valve for controlling the communication of a fluid circuit formed by the orifice passage, the one-way valve, and the like.

In a preferred example of the invention, the reciprocating member may include a piston and a piston rod connected to the piston. Further, the damping-force generating means may include a cylinder which accommodates the piston reciprocatably and through which the piston rod is passed; a control orifice valve which is communicated at one port thereof with one chamber within the cylinder partitioned by the piston and is communicated at another port thereof with another chamber within the cylinder partitioned by the piston; and a fluid accommodated in the cylinder. Furthermore, the controlling means may be adapted to control the control orifice valve on the basis of the reciprocating motion of the piston, so as to generate the damping force by the passage of the fluid through the control orifice valve in the respective movement from the positive and negative maximum displacement position to the origin position in the reciprocating motion of the piston, while substantially not generating the damping force by the passage of the fluid through the control orifice valve in the respective movement from the origin position to the positive and negative maximum displacement position following that movement. In this case, the controlling means may have detecting means for detecting the reciprocating motion of the piston, and may be adapted to control the control orifice valve on the basis of the detecting means.

In the case where the reciprocating motion of the piston is detected, the detecting means may be adapted to detect the reciprocating motion of the piston itself, but may be adapted to detect such as the reciprocating motion of the piston rod or the vibration of the structure to which the piston rod is connected.

As the fluid, it is possible to cite a silicone-based fluid as a preferred example, but the fluid may be another fluid, such as a liquid, e.g., an oil other than the silicone-based fluid.

A structure in accordance with the invention is connected to the vibrational energy absorbing apparatus according to any one of the above-described aspects so as to receive the vibration of the structure by the reciprocating member. Here, the structure may be base-isolated by laminated rubber, sliding members, roller members, or the like, in which case the structure may be connected to returning means for returning the structure to its initial position after the vibration. Such a returning means may have a resilient device interposed between the structure and the ground where the structure is installed, and the resilient device may have at least one of a laminated rubber bearing and a coil spring.

ADVANTAGES OF THE INVENTION

According to the invention, it is possible to provide a vibrational energy absorbing apparatus which makes it unnecessary to make especially large the rigidity of that portion of the structure which receives the resistance force, the restoring force of the restoring means, and the structure having the apparatus.

BEST MODE FOR CARRYING OUT THE INVENTION

Next, a more detailed description will be given of the present invention and the mode for carrying it out with reference to the preferred embodiments illustrated in the drawings. It should be noted that the invention is not limited to these embodiments.

Figure 1:
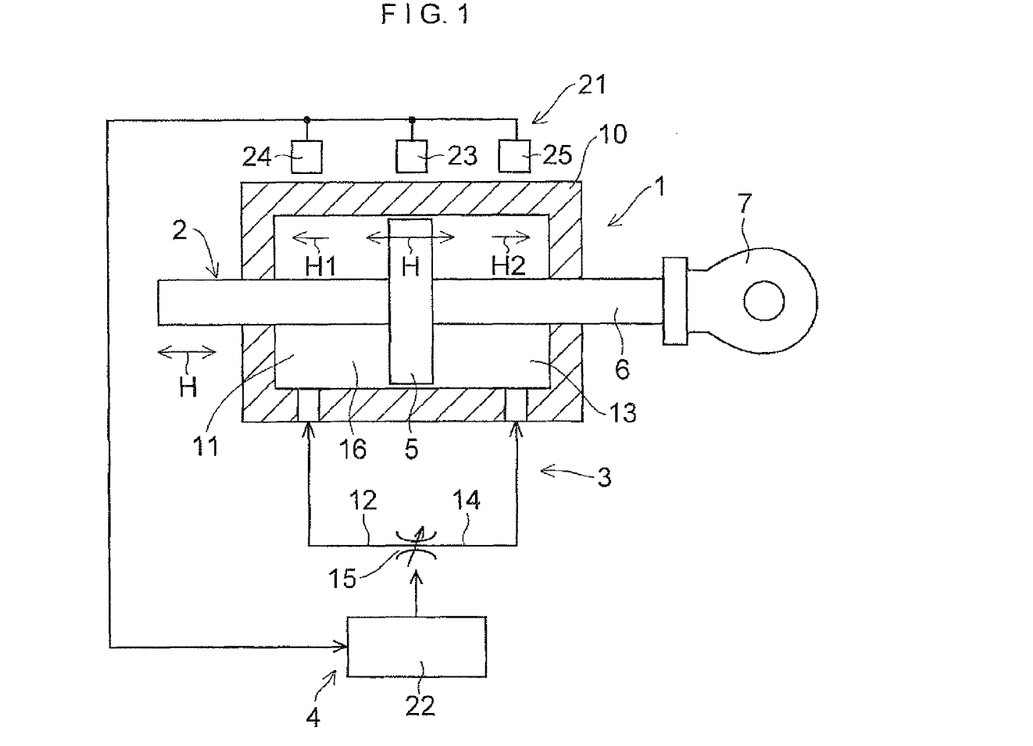
FIG. 1 is an explanatory diagram of a preferred embodiment of the invention.

In FIG. 1, a vibrational energy absorbing apparatus 1 in accordance with this embodiment is comprised of a reciprocating member 2 which is reciprocatable in H directions between positive and negative maximum displacement positions D±max (positions shown in FIGS. 3 and 5) with respect to an origin position O (position shown in FIGS. 1, 4, and 6); a damping-force generating means 3 for generating a damping force R with respect to the reciprocating motion of the reciprocating member 2 in the H direction; and a controlling means 4 for controlling the damping-force generating means 3 so as to cause the damping-force generating means 3 to generate a fixed damping force R in the respective movement of the reciprocating member 2 in the H direction from the positive and negative maximum displacement position D±max to the origin position O in the reciprocating motion thereof in the H directions, while causing the damping-force generating means 3 to substantially not generate the damping force R, i.e., to generate a substantially zero damping force R, in the respective movement of the reciprocating member 2 in the H direction from the origin position O to the positive and negative maximum displacement position D±max following the aforementioned movement thereof in the H direction.

The reciprocating member 2 includes a piston 5, a piston rod 6 securely connected to the piston 5, and a mounting portion 7 secured to one end portion of the piston rod 6.

The damping-force generating means 3 includes a cylinder 10 which accommodates the piston 5 reciprocatably in the H directions and through which the piston rod 6 is passed; a control orifice valve 15 which is communicated at one port 12 thereof with one chamber 11 within the cylinder 10 partitioned by the piston 5 and is communicated at another port 14 thereof with another chamber 13 within the cylinder 10 partitioned by the piston 5; and a fluid, e.g., silicone oil, 16 accommodated in the cylinder 10.

The control orifice valve 15 has an orifice passage through which the silicone oil 16 supplied from the port 12 and directed toward the port 14 or supplied from the port 14 and directed toward the port 12 flows, and the diameter of which is adapted to be controlled. The control orifice valve 15 is adapted to generate the damping force R by the flow resistance caused as the silicone oil 16 flows through such an orifice passage.

The controlling means 4 includes a detecting means 21 for detecting the reciprocating motion of the piston 5 in the H direction and a control unit 22 having a microcomputer and the like for controlling the diameter of the orifice passage of the control orifice valve 15 on the basis of the result of detection from the detecting means 21.

The detecting means 21 has three detectors 23, 24, and 25 for respectively detecting the position of the piston 5 and disposed by being arranged in the H direction. The detector 23 is disposed at a substantially central position of the cylinder 10 in the H directions; the detector 24 is disposed at a substantially maximum movable position of the piston 5 in an H1 direction in the H directions; and the detector 24 is disposed at a maximum movable position of the piston 5 in an H2 direction which is opposite to the H1 direction in the H directions. As such detectors 23, 24, and 25, it is possible to use non-contact type sensors such as magnetic sensors.

The control unit 22 is adapted to subject the results of detection from the detectors 23, 24, and 25 to processing such as addition, subtraction, differentiation, integration, and the like so as to determine the arrival at the positive and negative maximum displacement positions D±max of the piston 5, the arrival at the origin position O of the piston 5, and the moving direction of the piston 5.

The controlling means 4 is adapted to control the control orifice valve 15 on the basis of the reciprocating motion of the piston 5 in the H directions, i.e., on the basis of the detection result from the detecting means 21 in this embodiment, so as to generate the predetermined damping force R by the passage of the silicone oil 16 through the orifice passage of the control orifice valve 15 in the respective movement from the positive and negative maximum displacement position D±max to the origin position O in the reciprocating motion of the piston 5 in the H directions, while substantially not generating the damping force O by the passage of the silicone oil 16 through the orifice passage of the control orifice valve 15 in the respective movement from the origin position O to the positive and negative maximum displacement position±max following the aforementioned movement.

Figure 2:
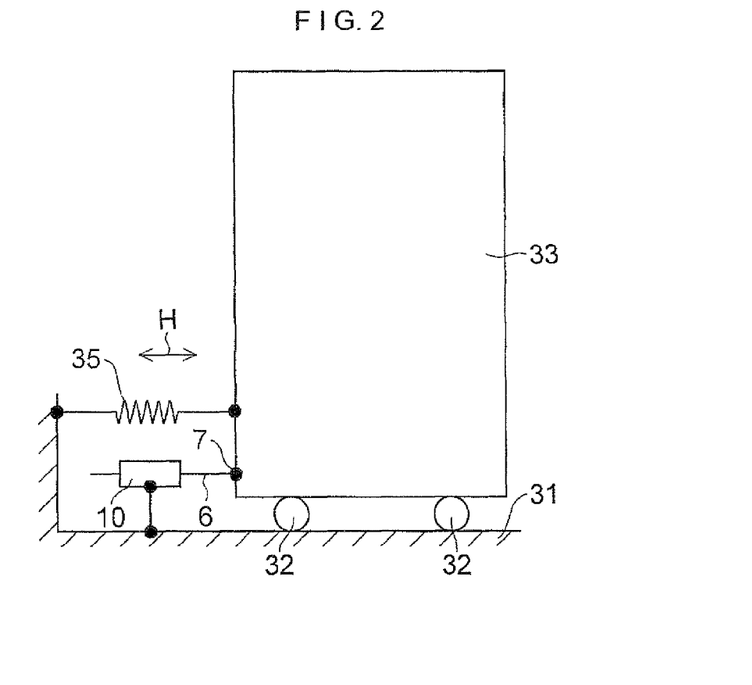
FIG. 2 is an explanatory diagram of an embodiment in which the embodiment shown in FIG. 1 is used in a structure.

As shown in FIG. 2, the above-described vibrational energy absorbing apparatus 1 is used such that the piston rod 6 is connected via the mounting portion 7 to a base-isolated structure 33 installed on the ground 31 including a foundation via rollable rollers 32 so as to be movable in the H directions (horizontal direction) with respect to the ground 31, so as to receive the vibrations of the structure 33 in the H directions, while the cylinder 10 is fixed to the ground 31.

The returning means for returning the structure 33 to its initial position has a resilient device constituted by a coil spring 35 interposed between the structure 33 and the ground 31 where the structure 33 is installed. The coil spring 35 having a modulus of elasticity K is compressed or extended in the vibration of the structure 33 in the H directions due to an earthquake, and is adapted to return the structure 33 to its initial position (corresponding to the origin position O) prior to the vibration by its restoring force (resiliency) when the earthquake has subsided. The coupling of the piston rod 6 of the reciprocating member 2 to the structure 33 side by means of the mounting portion 7 is effected so that, as shown in FIG. 1, the piston 5 is positioned substantially in the center of the cylinder 10 in the H directions, i.e., at the origin position O, in a state in which the structure 33 is returned to its initial position by the coil spring 35 and set stationary without the occurrence of vibrations in the structure 33.

Figure 3:
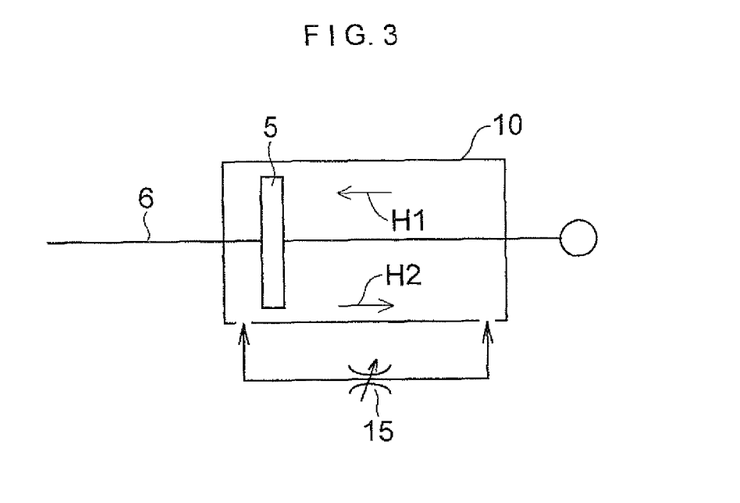
FIG. 3 is a diagram explaining the operation of the embodiment shown in FIG. 2.

In this state, the control unit 22 which receives the detection result from the detecting means 21 indicating that the piston 5 is present at the origin position O (D=0) controls the control orifice valve 15 so as to make the diameter of the orifice passage of the control orifice valve 15 maximum, i.e., such that the damping force R is substantially not generated (R=0) even when the silicone oil 16 flows through the orifice passage of the control orifice valve 15. When the structure 33 is vibrated in the H directions by an earthquake, and the piston 5 is first moved in the H1 direction in the H directions through the piston rod 6, as shown in FIG. 3, the silicone oil 16 on the chamber 11 side flows into the chamber 13 side through the orifice passage of the control orifice valve 15. Hence, in the movement of the piston 5 in the H1 direction from the substantially central position (origin position O, D=0) to the positive maximum displacement position (D=D+max) in the H1 direction, the damping force-generating means 3 generates a zero reaction force (resistance) R indicated by a straight line 41 in FIG. 7 and based on the diametrically maximized orifice passage of the control orifice valve 15, and imparts it to the piston rod 6.

Further, when the piston 5 starts to be moved in the H2 direction which is an opposite direction to the H1 direction in the H directions after the piston 5 was moved to the positive maximum displacement position (D=D+max) in the H1 direction, as shown in FIG. 3, the control unit 22 which receives the detection result from the detecting means 21 determines that the piston 5 has reached the positive maximum displacement position (D=D+max) in the H1 direction and started to be moved in the H2 direction which is the opposite direction to the H1 direction in the H directions. Thereupon, the control unit 22 immediately controls the control orifice valve 15 so as to make the diameter of the orifice passage of the control orifice valve 15 small to thereby generate the fixed damping force R when the silicone oil 16 flows through the orifice passage of the control orifice valve 15. When the piston 5 is moved in the H2 direction in this state, the silicone oil 16 on the chamber 13 side this time flows into the chamber 11 side through the orifice passage of the control orifice valve 15. As a result, in the movement of the piston 5 in the H2 direction from the positive maximum displacement position (D=D+max) to the substantially central position (origin position O, D=0) in the H2 direction, the damping-force generating means 3 generates the fixed reaction force (resistance) R indicated by a curve 42 in FIG. 7 and based on the reduced orifice passage of the control orifice valve 15, and imparts it to the piston rod 6.

Figure 4:
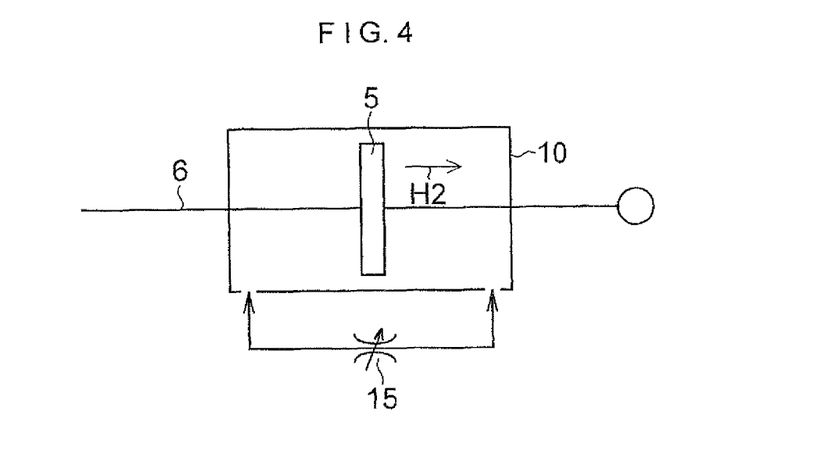
FIG. 4 is a diagram explaining the operation of the embodiment shown in FIG. 2.

Further, when the piston 5 reaches the substantially central position (origin position O, D=0), as shown in FIG. 4, after the piston 5 was moved in the H2 direction from the positive maximum displacement position (D=D+max), as shown in FIG. 3, the control unit 22 which receives the detection result from the detecting means 21 determines that the piston 5 has reached the substantially central position (D=0). Thereupon, the control unit 22 immediately controls the control orifice valve 15 so as to make the diameter of the orifice passage of the control orifice valve 15 maximum, i.e., such that the damping force R is substantially not generated (R=0) even when the silicone oil 16 flows through the orifice passage of the control orifice valve 15.

Figure 7:
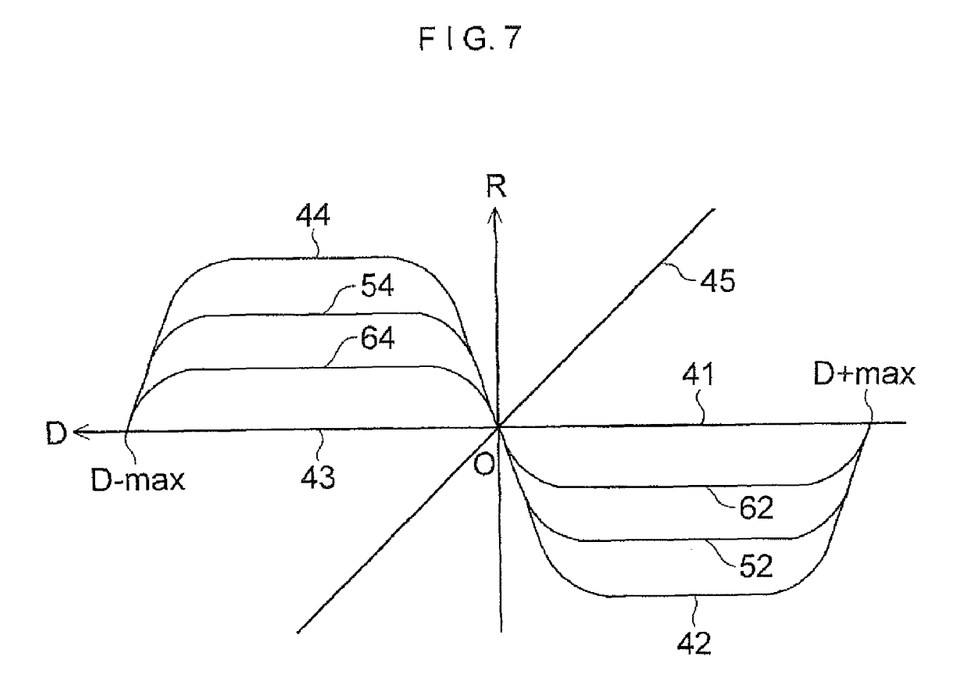
FIG. 7 is a diagram explaining the operation of the embodiment shown in FIG. 2.

When the piston 5 is further moved continuously from the substantially central position (D=0) of the cylinder 10 in the H2 direction, in the movement of the piston 5 in the H2 direction from the substantially central position (D=0) in the H2 direction the damping-force generating means 3 generates the zero reaction force (resistance) R indicated by a straight line 43 in FIG. 7 and based on the orifice passage with a maximally enlarged diameter of the control orifice valve 15, and imparts it to the piston rod 6.

Figure 5:
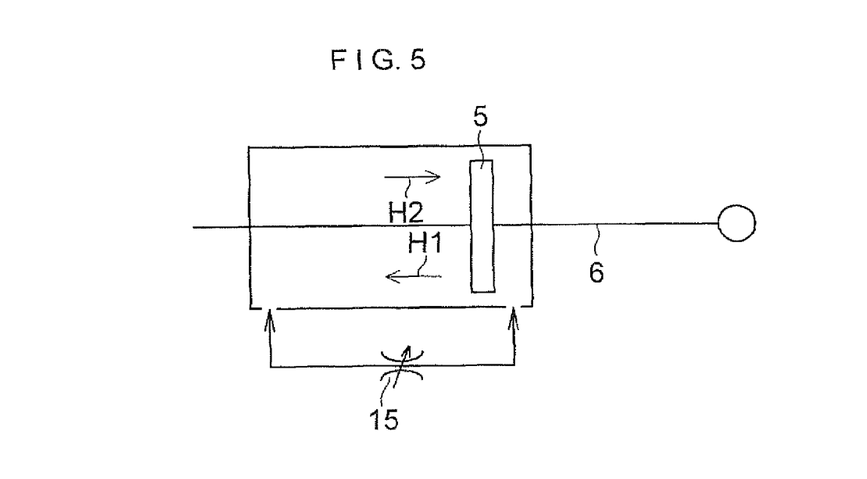
FIG. 5 is a diagram explaining the operation of the embodiment shown in FIG. 2.

When the piston 5 starts to be moved again in the H1 direction which is the opposite direction to the H2 direction in the H1 directions after the piston 5 reached the negative maximum displacement position (D=D−max) in the H2 direction, as shown in FIG. 5, owing to the movement in the H2 direction from the substantially central position (D=0) shown in FIG. 4, the control unit 22 which receives the detection result from the detecting means 21 determines that the piston 5 has reached the negative maximum displacement position (D=D−max) in the H2 direction and started to be moved in the H1 direction which is the opposite direction to the H2 direction in the H directions. Thereupon, the control unit 22 immediately controls the control orifice valve 15 so as to make the diameter of the orifice passage of the control orifice valve 15 small to thereby generate the fixed damping force R when the silicone oil 16 flows through the orifice passage of the control orifice valve 15. When the piston 5 is moved in the H1 direction in this state, the silicone oil 16 on the chamber 11 side flows again into the chamber 13 side through the orifice passage of the control orifice valve 15. As a result, in the movement of the piston 5 in the H1 direction from the negative maximum displacement position (D=D−max) to the substantially central position (origin position O, D=0) in the H1 direction, the damping-force generating means 3 generates the fixed reaction force (resistance) R indicated by a curve 44 in FIG. 7 and based on the reduced orifice passage of the control orifice valve 15, and imparts it to the piston rod 6.

Figure 6:
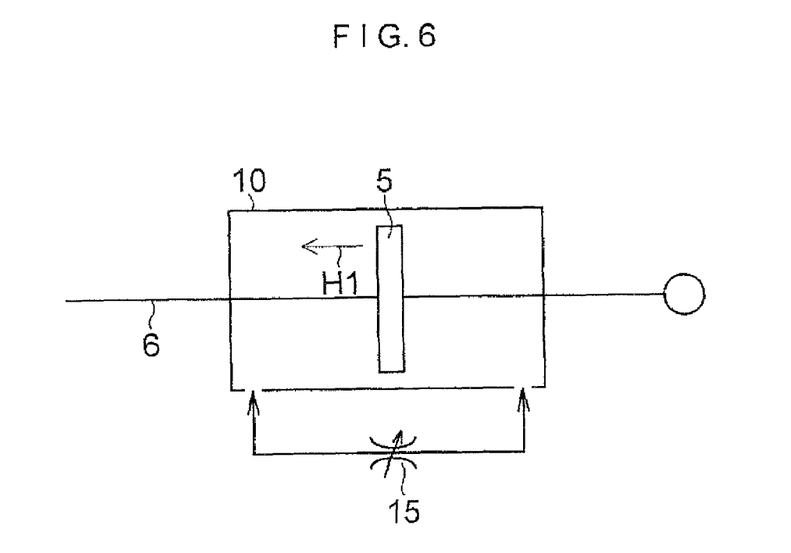
FIG. 6 is a diagram explaining the operation of the embodiment shown in FIG. 2.

Further, when the piston 5 reaches the substantially central position (origin position O, D=0), as shown in FIG. 6, after the piston 5 was moved in the H1 direction from the negative maximum displacement position (D=D−max), as shown in FIG. 5, the control unit 22 which receives the detection result from the detecting means 21 determines that the piston 5 has reached the substantially central position (D=0). Thereupon, the control unit 22 immediately controls the control orifice valve 15 so as to make the diameter of the orifice passage of the control orifice valve 15 maximum, i.e., such that the damping force R is substantially not generated (R=0) even when the silicone oil 16 flows through the orifice passage of the control orifice valve 15. Thus, in the movement of the piston 5 in the H1 direction from the substantially central position (origin position O, D=0) to the positive maximum displacement position (D=D+max) in the H1 direction, the damping-force generating means 3 generates again the zero reaction force (resistance) R indicated by the straight line 41 in FIG. 7, and imparts it to the piston rod 6.

Thereafter, after the piston 5 was moved again to the positive maximum displacement position (D=+max) in the H1 direction, the above-described operation is repeated insofar as the piston 5 vibrates in the H2 direction and the H1 direction. Hence, the vibrational energy absorbing apparatus 1 imparts to the piston rod 6 the damping force R (reaction force R) consisting of damping loops indicated by the straight line 41, the curve 42, the straight line 43, and the curve 44 shown in FIG. 7, consequently damping the vibration of the structure 33 in the H directions due to the earthquake. Then, in the vibrational energy absorbing apparatus 1, in conjunction with the reduction of the amplitude and velocity of the vibration of the structure 33 in the H directions due to the earthquake, the damping loops indicated by the straight line 41, the curve 42, the straight line 43, and the curve 44 become small, and the damping indicated by the damping loops is imparted to the vibration of the structure 33 in the H directions due to the earthquake. When the vibration of the structure 33 subsides, the structure 33 is disposed at the initial position by the restoring force of the coil spring 35.

Incidentally, the restoring force R of the coil spring 35 such as indicated by a restoring force straight line 45 shown in FIG. 7 and the damping force R (reaction force R) of the vibrational energy absorbing, apparatus 1 are loaded to the structure 33 during the vibration of the structure 33 with respect to the respective positions D of the piston 5 in the H directions. However, since the vibrational energy absorbing apparatus 1 has the so-called negative stiffness with respect to the displacement of the structure 33 at the position D, the resultant force of the damping force R of the vibrational energy absorbing apparatus 1 and the restoring force R of the coil spring which are loaded to the structure 33 becomes relatively small, so that the rigidity of the structure 33 which receives this resultant force need not be made especially large.

Namely, according to the vibrational energy absorbing apparatus 1, the arrangement provided is such that the controlling means 4 causes the damping-force generating means 3 to generate a fixed damping force in the respective movement of the reciprocating member 2 from the positive and negative maximum displacement position D±max to the origin position O in the reciprocating motion thereof in the H directions, while causing the damping-force generating means 3 to substantially not generate the damping force in the respective movement of the reciprocating member 2 from the origin position O to the positive and negative maximum displacement position D±max following that movement. Therefore, even if the vibrational energy absorbing apparatus 1 is installed to the structure 33 by connecting the reciprocating member 2 to that structure 33 for the purpose of vibration control of the structure 33, in the respective movement from the origin position O to the positive and negative maximum displacement position D±max in the vibration of the structure 33 due to an earthquake or the like, a force based on the damping force of the vibrational energy absorbing apparatus 1 is not generated at that portion of the structure 33 to which the reciprocating member 2 is connected. As a result the rigidity of that portion need not be made very large. Moreover, in the respective movement from the positive and negative maximum displacement position D±max to the origin position O in the vibration of the structure 33 due to an earthquake or the like, the returning force of the juxtaposed coil spring 35 and the damping force of the vibrational energy absorbing apparatus 1 are offset by each other, which also makes it unnecessary to make very large the rigidity of that portion of the structure 33 to which the reciprocating member 2 is connected.

The above-described case is that of the structure 33 which is base-isolated by the rollers 32. Alternatively, however, the structure 33 may be base-isolated by being installed on the ground 31 via sliding members or the like so as to be movable in the H directions with respect to the ground 31. Still alternatively, the structure may be base-isolated by laminated rubber bearings, in which case the coil spring 35 may be omitted, and the laminated rubber bearings serving as resilient devices may be provided with the returning function. Furthermore, the structure may be one which is not base-isolated, in which case the returning means may not be especially provided separately from the structure, and the structure itself may be provided with the returning function. In addition, an arrangement may be provided such that optimum damping loops such as those expressed by the straight line 41, a curve 52, the straight line 43, and a curve 54 or by the straight line 41, a curve 62, the straight line 43, and a curve 64 in FIG. 7 can be obtained for a structure which is base-isolated by adjusting the passage resistance of the orifice passage of the control orifice valve 15 or a structure which is not base-isolated. It should be noted that the curves shown in FIG. 7 are fundamental curves for explanation and, in practice, the curve 42 and the straight line 43 are connected without passing through the origin (=0), and the same holds true of the curve 44 and the straight line 41 as well.

In addition, although the controlling means 4 controls the control orifice valve 15 of the damping-force generating means 3 so as to set the diameter of the orifice passage of the control orifice valve 15 to a fixed reduced diameter from the positive and negative maximum displacement position D±max to the origin position O, the controlling means 4 may alternatively control the control orifice valve 15 of the damping-force generating means 3 so as to gradually reduce the diameter of the orifice passage of the control orifice valve 15 in the respective movement of the reciprocating member 2 from the positive and negative maximum displacement position D±max to the origin position O in the reciprocating motion thereof in the H directions, in order to cause the damping-force generating means 3 to generate a gradually decreasing damping force R. Furthermore, the controlling means 4 and the damping-force generating means 3 may be constructed by mechanical ones which are capable of operating even at the time of power failure without including electrically operated ones such as the detectors 23, 24, and 25, the control unit 22, and the control orifice valve 15.

The invention claimed is:

1. A vibrational energy absorbing apparatus comprising:
a reciprocating member which is reciprocatable between positive and negative maximum displacement positions with respect to an original position;
damping-force generating means for generating a damping force with respect to the reciprocating motion of said reciprocating member; and
controlling means for controlling said damping-force generating means so as to cause said damping-force generating means to generate a damping force in the respective movement of said reciprocating member from the positive and negative maximum displacement position to the original position in the reciprocating motion thereof, while causing said damping-force generating means to substantially not generate the damping force in the respective movement of said reciprocating member from the original position to the positive and negative maximum displacement position following that movement.

2. The vibrational energy absorbing apparatus according to claim 1, wherein said controlling means is adapted to control said damping-force generating means so as to cause said damping-force generating means to generate a substantially fixed damping force in the respective movement of said reciprocating member from the positive and negative maximum displacement position to the original position in the reciprocating motion thereof.

3. The vibrational energy absorbing apparatus according to claim 1, wherein said controlling means is adapted to control said damping-force generating means so as to cause said damping-force generating means to generate a gradually decreasing damping force in the respective movement of said reciprocating member from the positive and negative maximum displacement position to the original position in the reciprocating motion thereof.

4. The vibrational energy absorbing apparatus according to claim 1, wherein said reciprocating member includes a piston and a piston rod connected to the piston,
wherein said damping-force generating means includes a cylinder which accommodates the piston reciprocatably and through which the piston rod is passed; a control orifice valve which is communicated at one port thereof with one chamber within the cylinder partitioned by the piston and is communicated at another port thereof with another chamber within the cylinder partitioned by the piston; and a fluid accommodated in the cylinder, and
wherein said controlling means is adapted to control the control orifice valve on the basis of the reciprocating motion of the piston, so as to generate the damping force by the passage of the fluid through the control orifice valve in the respective movement from the positive and negative maximum displacement position to the original position in the reciprocating motion of the piston, while substantially not generating the damping force by the passage of the fluid through the control orifice valve in the respective movement from the original position to the positive and negative maximum displacement position following that movement.

5. The vibrational energy absorbing apparatus according to claim 4, wherein said controlling means has detecting means for detecting the reciprocating motion of the piston, and is adapted to control the control orifice valve on the basis of the detecting means.

6. A structure which is connected to the vibrational energy absorbing apparatus according to claim 1 so as to receive the vibration of said structure by said reciprocating member.

7. The structure according to claim 6, wherein said structure is a base-isolated structure which is connected to returning means for returning said structure to its initial position after the vibration.

8. The structure according to claim 7, wherein said returning means has a resilient device interposed between said structure and a ground where said structure is installed.

9. The structure according to claim 8, wherein said resilient device has at least one of a laminated rubber bearing and a coil spring.

10. A vibrational energy absorbing apparatus comprising:
a reciprocating member which is configured to generate a reciprocating motion between positive and negative maximum displacement positions with respect to an origin, the reciprocating motion including a first state of motion in the direction of the origin to the positive or negative maximums, and a second state of motion in the direction of the positive or negative maximums to the origin;
a force damper to dampen a force with respect to the reciprocating motion of said reciprocating member; and
a force damper controller to control the force damper so as to cause the force damper to generate a damping force with respect to the second state of motion, the force damper controller to control the force damper to substantially not generate the damping force with respect to the first state of motion.

11. The vibrational energy absorbing apparatus according to claim 10, wherein the force damper controller is adapted to control the force damper to generate a substantially fixed damping force with respect to the second state of motion.

12. The vibrational energy absorbing apparatus according to claim 10, wherein the force damper controller is adapted to control the force damper to generate a gradually decreasing damping force with respect to the second state of motion.

13. The vibrational energy absorbing apparatus according to claim 10, wherein said reciprocating member includes a piston and a piston rod connected to the piston,
wherein the force damper includes a cylinder which accommodates the piston reciprocatably and through which the piston rod is passed; a control orifice valve which is communicated at one port thereof with one chamber within the cylinder partitioned by the piston and is communicated at another port thereof with another chamber within the cylinder partitioned by the piston; and a fluid accommodated in the cylinder, and
wherein the force damper controller is adapted to control the control orifice valve on the basis of the reciprocating motion of the piston, the force damper to generate the damping force by the passage of the fluid through the control orifice valve in the second state of motion in the reciprocating motion of the piston, the damping force substantially not generating the damping force by the passage of the fluid through the control orifice valve in the first state of motion.

14. The vibrational energy absorbing apparatus according to claim 13, wherein the force damper controller has a sensor to detect the reciprocating motion of the piston, and is adapted to control the control orifice valve on a status of the sensor.

15. A structure which is connected to the vibrational energy absorbing apparatus according to claim 10 so as to receive the vibration of said structure by said reciprocating member.

16. The structure according to claim 15, wherein said structure is a base-isolated structure which is connected to a bias generator for returning said structure to its initial position after the vibration.

17. The structure according to claim 16, wherein the bias generator has a resilient device interposed between said structure and a ground where said structure is installed.

18. The structure according to claim 17, wherein said resilient device has at least one of a laminated rubber bearing and a coil spring.

* * * * *